Patented July 27, 1937

2,088,022

UNITED STATES PATENT OFFICE 2,088,022

DERIVATIVES OF 2-MERCAPTO-ARYL-THIAZOLES

Ira Williams, Woodstown, N. J., assignor to E. I. du Pont de Nemours & Company, Wilmington, Del., a corporation of Delaware No Drawing. Application March 3, 1933, Serial No. 659,501

22 Claims. (Cl. 260—44)

This invention relates to derivatives of 2-mercapto-aryl-thiazoles and more specifically to liquid condensation products of 1-mercapto-aryl-thiazoles and halogenated ketones.

Condensation products of mercapto-benzothiazole with ketones containing a halogen substituted methyl group connected directly to the ketone group, which products are useful as accelerators in the vulcanization of rubber, have been disclosed in British Patents 360,491 and 361,917.

An object of the present invention is to provide a new class of chemical compounds which comprise condensation products of mercapto-aryl-thiazoles and halogenated ketones. A further object is to provide a method for preparing such compounds. A still further object is to provide a new class of accelerators for the vulcanization of rubber which accelerators are generally liquids at ordinary temperatures. Other objects are to provide new compositions of matter and to advance the art. Still other objects will appear hereinafter.

These objects may be accomplished in accordance with my invention which comprises causing a salt of a mercapto-aryl-thiazole to react with a compound of the type:

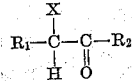

wherein X represents a halogen and $R_1$ and $R_2$ represent alkyl groups which may be the same or different. The compounds thus produced are new chemical compounds which have not been known heretofore and which I have found to be particularly valuable as accelerators in the vulcanization of rubber.

This class of compounds may be readily prepared by introducing the halogenated ketone into an aqueous solution of a water soluble salt of a mercapto-aryl-thiazole. While these ketones are almost insoluble in water, the reaction is readily brought about by stirring the mixture sufficiently to disperse the halogenated ketone throughout the thiazole solution. The reaction product generally separates out as an insoluble immiscible liquid layer.

Among the ketones which I have found to be particularly valuable for my purpose are the following:

2-chlor-butanone-3

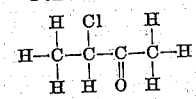

2-chlor-pentanone-3

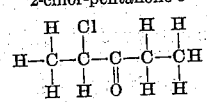

3-chlor-pentanone-2

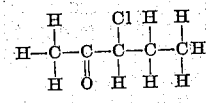

In order to more clearly illustrate my invention and the preferred mode in which I contemplate carrying the same into effect, the following examples are given:

Example 1

167 parts of mercaptobenzothiazole and 40 parts of sodium hydroxide were dissolved in 400 parts of water and brought to a temperature of 5° C. 107 parts of 2-chlor-butanone-3 were added and the mixture stirred for 15 minutes. After the stirring was discontinued, the 3 butanone 2(1 benzothiazyl) sulfide separated as a brown oil.

Example 2

167 parts of mercaptobenzothiazole and 40 parts of sodium hydroxide were dissolved in 400 parts of water and cooled to about 5° C. 121 parts of 2-chlor-pentanone-3 were added and the mixture was stirred. The temperature increased to 25° C. and the stirring was continued for 10 minutes. The 3 pentanone 2(1 benzothiazyl) sulfide was permitted to settle as a brown oil.

Example 3

167 parts of mercaptobenzothiazole and 40 parts of sodium hydroxide were dissolved in 400 parts of water and cooled. 121 parts of 3-chlor-pentanone-2 were added and stirring was continued for 15 minutes. On standing, the 2 pentanone 3(1 benzothiazyl) sulfide separated as a brown oil.

In order to test the effects of these compounds in rubber the following mixes were prepared:

|  | #1 | #2 | #3 | #4 |
|---|---|---|---|---|
| Rubber | 100 | 100 | 100 | 100 |
| Zinc oxide | 5 | 5 | 5 | 5 |
| Carbon black | 25 | 25 | 25 | 25 |
| Stearic acid | 3 | 3 | 3 | 3 |
| Sulfur | 3 | 3 | 3 | 3 |
| Diphenyl guanidine | .86 | .86 | .86 | .86 |
| 3-butanone-2(1-benzothiazyl) sulfide | .34 | | | |
| 3-pentanone-2(1-benzothiazyl) sulfide | | .34 | | |
| 2-pentanone-3(1-benzothiazyl) sulfide | | | .34 | |

Samples of these various mixes were vulcanized at temperatures of 278° F. for periods of 20, 30, 45 and 60 minutes and then were tested for tensile strength. The results of these tests are given in the following table:

| | Lbs. tensile at break | | | |
|---|---|---|---|---|
| Minutes at 287° | #1 | #2 | #3 | #4 |
| 20 | 3350 | 3120 | 3075 | 1550 |
| 30 | 4200 | 3975 | 3875 | 2225 |
| 45 | 4375 | 4150 | 4050 | 2775 |
| 60 | 4075 | 4100 | 3850 | 3000 |

The compounds produced in accordance with my invention have many advantages over other accelerators heretofore produced. They are generally liquids which disperse readily in the rubber, hence greatly facilitating the mixing operation. Further, they have a greater accelerating strength than those produced from ketones halogenated in a methyl group adjacent to the ketone group. This is indicated, not only by the vulcanization tests but also, by the differences in the ease of hydrolysis of the condensation products. When hydrolized, the compounds obtained in accordance with my invention generate the mercapto-aryl-thiazoles which act as accelerating agents. These compounds of my invention are more readily hydrolyzed than those produced from ketones halogenated in the methyl group adjacent to the ketone group. For example, if the condensation products obtained from 1-chlor-butanone-2 is hydrolyzed in dilute alcoholic caustic at 65° C., the hydrolysis requires more than 90 minutes to go to completion while under the same conditions, the product derived from 3-chlor-butanone-2, obtained in accordance with my invention, is hydrolyzed in 3 minutes.

While I have disclosed the preparation of products from mercapto-benzo-thiazole, in the examples, it will be understood that similar products may be obtained from the other mercapto-aryl-thiazoles such as mercapto-naphtho-thiazoles and the mercapto-benzo- and naphtho-thiazoles having substituents such as alkyl, alkaryl and aryl groups and halogens substituted in the aryl nuclei. Further, other halogenated ketones of the type described may be employed. Also, other solvents and suspending media may be employed in place of the water, if desired. Some of the solvents and suspending media which may be employed comprise the following: Alcohol, benzene, acetone, and carbon tetrachloride.

While I have disclosed certain specific compounds and compositions it will be readily apparent to those skilled in the art that many variations and modifications may be made in the ingredients and conditions employed without departing from the spirit of my invention. Accordingly, the scope of my invention is to be limited solely by the appended claims construed as broadly as is permissible in view of the prior art.

I claim:

1. The process which comprises reacting a salt of a mercapto-aryl-thiazole of the benzene and naphthalene series with a compound of the type:

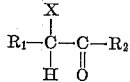

wherein X represents a halogen and $R_1$ and $R_2$ represent alkyl groups.

2. The process which comprises reacting in water a salt of a mercapto-aryl-thiazole of the benzene and naphthalene series with a compound of the type:

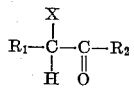

wherein X represents a halogen and $R_1$ and $R_2$ represent alkyl groups.

3. The process which comprises reacting a salt of a mercapto-benzo-thiazole with a compound of the type:

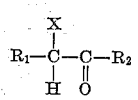

wherein X represents a halogen and $R_1$ and $R_2$ represent alkyl groups.

4. The process which comprises reacting in water a salt of a mercapto-benzo-thiazole with a compound of the type:

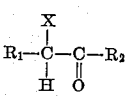

wherein X represents a halogen and $R_1$ and $R_2$ represent alkyl groups.

5. The process which comprises reacting a salt of a mercapto-benzo-thiazole with a compound of the type:

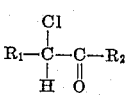

wherein $R_1$ and $R_2$ represent alkyl groups.

6. A chemical compound having the formula

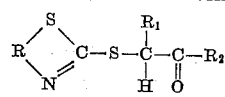

where R represents a benzene or naphthalene nucleus and $R_1$ and $R_2$ represent alkyl groups.

7. A chemical compound having the formula

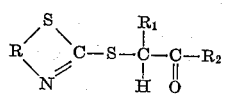

wherein R represents a benzene nucleus and $R_1$ and $R_2$ represent alkyl groups.

8. A chemical compound having the formula

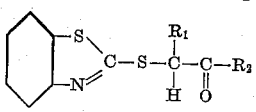

wherein $R_1$ and $R_2$ represent alkyl groups.

9. The process which comprises reacting in water an alkali metal salt of a mercapto-arylthiazole of the benzene and naphthalene series with 2-chlor-butanone-3.

10. The process which comprises reacting in water an alkali metal salt of a mercapto-benzothiazole with 2-chlor-butanone-3.

11. The process which comprises reacting in water an alkali metal salt of 1-mercapto-benzothiazole with 2-chlor-butanone-3.

12. The process which comprises reacting in water an alkali metal salt of a mercapto-arylthiazole of the benzene and naphthalene series with 2-chlor-pentanone-3.

13. The process which comprises reacting in water an alkali metal salt of a mercapto-benzothiazole with 2-chlor-pentanone-3.

14. The process which comprises reacting in water an alkali metal salt of a mercapto-arylthiazole of the benzene and naphthalene series with 3-chlor-pentanone-2.

15. The process which comprises reacting in water an alkali metal salt of a mercapto-benzothiazole with 3-chlor-pentanone-2.

16. A chemical compound having the formula

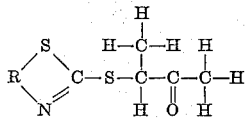

wherein R represents a benzene or naphthalene hydrocarbon radical.

17. A chemical compound having the formula

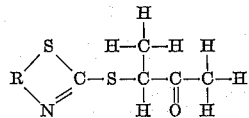

wherein R represents a benzene hydrocarbon radical.

18. 2-butanone-2(1-benzothiazyl) sulfide.

19. A chemical compound having the formula

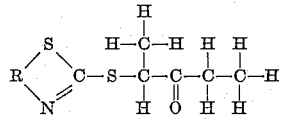

wherein R represents a benzene or naphthalene hydrocarbon radical.

20. 3-pentanone-2(1-benzothiazyl) sulfide.

21. A chemical compound having the formula

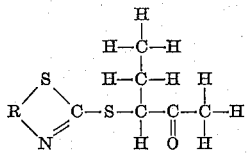

wherein R represents a benzene or naphthalene hydrocarbon radical.

22. 2-pentanone-3(1-benzothiazyl) sulfide.

IRA WILLIAMS.

CERTIFICATE OF CORRECTION.

Patent No. 2,088,022.  July 27, 1937.

IRA WILLIAMS.

It is hereby certified that error appears in the printed specification of the above numbered patent requiring correction as follows: Page 3, second column, line 9, claim 18, for the numeral "2" first occurrence, read 3; and that the said Letters Patent should be read with this correction therein that the same may conform to the record of the case in the Patent Office.

Signed and sealed this 18th day of January, A. D. 1938.

Henry Van Arsdale,
Acting Commissioner of Patents.

(Seal)